United States Patent
Thorpe et al.

(10) Patent No.: US 10,721,219 B2
(45) Date of Patent: Jul. 21, 2020

(54) METHOD FOR ESTABLISHING A SECURE COMMUNICATION SESSION IN A COMMUNICATIONS SYSTEM

(71) Applicant: NXP B.V., Eindhoven (NL)

(72) Inventors: Geoffrey Thorpe, Quebec (CA); Peter Doliwa, Hamburg (DE); Vakul Garg, Shahdara (IN); Jan René Brands, Nijmegen (NL)

(73) Assignee: NXP B.V., Eindhoven (NL)

( * ) Notice: Subject to any disclaimer, the term of this patent is extended or adjusted under 35 U.S.C. 154(b) by 180 days.

(21) Appl. No.: 16/021,148

(22) Filed: Jun. 28, 2018

(65) Prior Publication Data

US 2020/0007519 A1 Jan. 2, 2020

(51) Int. Cl.
  *G06F 15/16* (2006.01)
  *H04L 29/06* (2006.01)

(52) U.S. Cl.
  CPC ........ *H04L 63/061* (2013.01); *H04L 63/0428* (2013.01); *H04L 63/166* (2013.01)

(58) Field of Classification Search
  CPC ..... H04L 63/0428; H04L 9/14; H04L 63/061; H04L 9/3066; H04L 63/0478; H04L 63/166; H04L 67/141; H04L 2463/061
  See application file for complete search history.

(56) References Cited

U.S. PATENT DOCUMENTS

| | | | |
|---|---|---|---|
| 7,441,119 B2 | 10/2008 | Brabson et al. | |
| 7,571,309 B2 | 8/2009 | Kim et al. | |
| 7,631,182 B1 | 12/2009 | Droux et al. | |
| 8,782,774 B1* | 7/2014 | Pahl | H04L 9/0825 726/15 |
| 9,531,685 B2 | 12/2016 | Gero et al. | |
| 9,531,691 B2 | 12/2016 | Gero et al. | |
| 2002/0090085 A1 | 7/2002 | Vanstone et al. | |
| 2007/0055880 A1 | 3/2007 | Lauter et al. | |
| 2009/0083538 A1 | 3/2009 | Merugu et al. | |
| 2010/0031042 A1* | 2/2010 | Di Crescenzo | H04L 63/06 713/169 |

(Continued)

OTHER PUBLICATIONS

Dierks, T., et al.; RFC5246 Standards; "The Transport Layer Security (TLS) Protocol Version 1.2;" Aug. 2008.

(Continued)

*Primary Examiner* — Cheikh T Ndiaye
(74) *Attorney, Agent, or Firm* — Daniel D. Hill

(57) ABSTRACT

A method is provided for establishing a communication session in a communications system. The method includes providing a handshake layer functional block in a first communication peer, and providing a data communication layer functional block separate from the handshake layer functional block in the first communication peer. Functionality of the data communication layer is not duplicated in the handshake layer. If the data communication layer is unable to process a received encrypted message; transmitting, by the data communication layer, a configuration request message to the handshake layer, and transmitting, by the handshake layer, in response to the configuration request message, a set channel state message to enable the data communication layer to process application data after a handshake phase of the protocol session is complete. Then, application data can be communicated through the data communication layer functional block of the first communication peer to a second communication peer.

20 Claims, 8 Drawing Sheets

(56) References Cited

U.S. PATENT DOCUMENTS

| | | |
|---|---|---|
| 2010/0250951 A1 | 9/2010 | Ueno et al. |
| 2016/0173280 A1 | 6/2016 | Tribble et al. |
| 2016/0226827 A1 | 8/2016 | Bohannon |
| 2019/0052608 A1* | 2/2019 | Skuratovich ........ H04L 63/0428 |
| 2019/0297079 A1* | 9/2019 | Delcourt ............. H04L 63/0823 |
| 2019/0312878 A1 | 10/2019 | Brown et al. |
| 2019/0356482 A1 | 11/2019 | Nix |
| 2019/0373058 A1 | 12/2019 | De Almeida Forjaz De Lacerda |
| 2020/0007327 A1 | 1/2020 | Garg et al. |

OTHER PUBLICATIONS

Park, Jiye, et al.; "Lightweight Secure Communication for CoAP-Enabled Internet of Things Using Delegated DTLS Handshake;" 2014 International Conference on Information and Communication Technology Convergence (ICTC), Oct. 22-24, 2014; DOI: 10.1109/ICTC.2014.6983078.

Watson, Dave; "KTLS: Linux Kernel Transport Layer Security".

Watson, Dave; "KTLS: Linux Kernel Transport Layer Security" Proposal by Facebook Engineer; Published 2016 (date provided in U.S. Appl. No. 16/021,125).

Notice of Allowance for U.S. Appl. No. 16/021,125 dated Apr. 8, 2020; 13 Pages.

Watson, Dave; "KTLS: Linux Kernel Transport Layer Security" Proposal by Facebook Engineer—Unable to Locate Date.

Notice of Allowance for U.S. Appl. No. 16/021,125 dated Feb. 5, 2020; 12 Pages.

Notice of Allowance for U.S. Appl. No. 16/021,174 dated Jun. 1, 2020; 28 Pages.

* cited by examiner

METHOD FOR ESTABLISHING A SECURE COMMUNICATION SESSION IN A COMMUNICATIONS SYSTEM

BACKGROUND

Field

This disclosure relates generally to communications, and more particularly, to a method for establishing a secure communication session in a communications system.

Related Art

Many communications today are secured using secure network communication protocols such as Transport Layer Security (TLS) and Datagram Transport Layer Security (DTLS). In TLS, a communication session is set up between a server and a device used by an end-user. The device may be a personal computer (PC), mobile device such as a cellular telephone, game console, TV, set-top box, etc. Typically, a TLS implementation consists of two main functional blocks or subprotocols: a handshake layer and a record layer. The handshake layer is responsible for session establishment (consisting of protocol negotiation, key agreement and authentication of the communication end points), while the record layer is responsible for protecting confidentiality and integrity of exchanged data. Also, the record layer is relatively simple and compact compared to the handshake layer. The handshake layer requires complex state transitions, certificate validation, verification of diverse constraints and conditions that are important for the security of the protocol). Also, the handshake layer is required to perform operations that require higher computational capacity (e.g. asymmetric crypto) and requires access to long-term cryptographic keys. Because of the higher complexity the handshake layer is usually the layer where most security vulnerabilities are found that require correction by updates.

Handshake layer processes the payload of handshake messages while the application processes application data messages. The record layer processes encryption and integrity protection of all messages and forwards all messages to their destination. The record layer may not be able to process an incoming message until the handshake layer completes security processing and provides the configuration needed for the record layer to continue. Because messages could be reordered or even lost in case of unreliable transfer, or a malicious entity could have tampered with the messages, simply pausing processing of incoming messages could cause long delays while waiting for a timeout or even cause deadlocks in the worst case. This could potentially be misused for denial-of-service (DoS) attacks.

Therefore, a need exists to provide solutions for at least some of the above problems in attempting to communicate securely.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
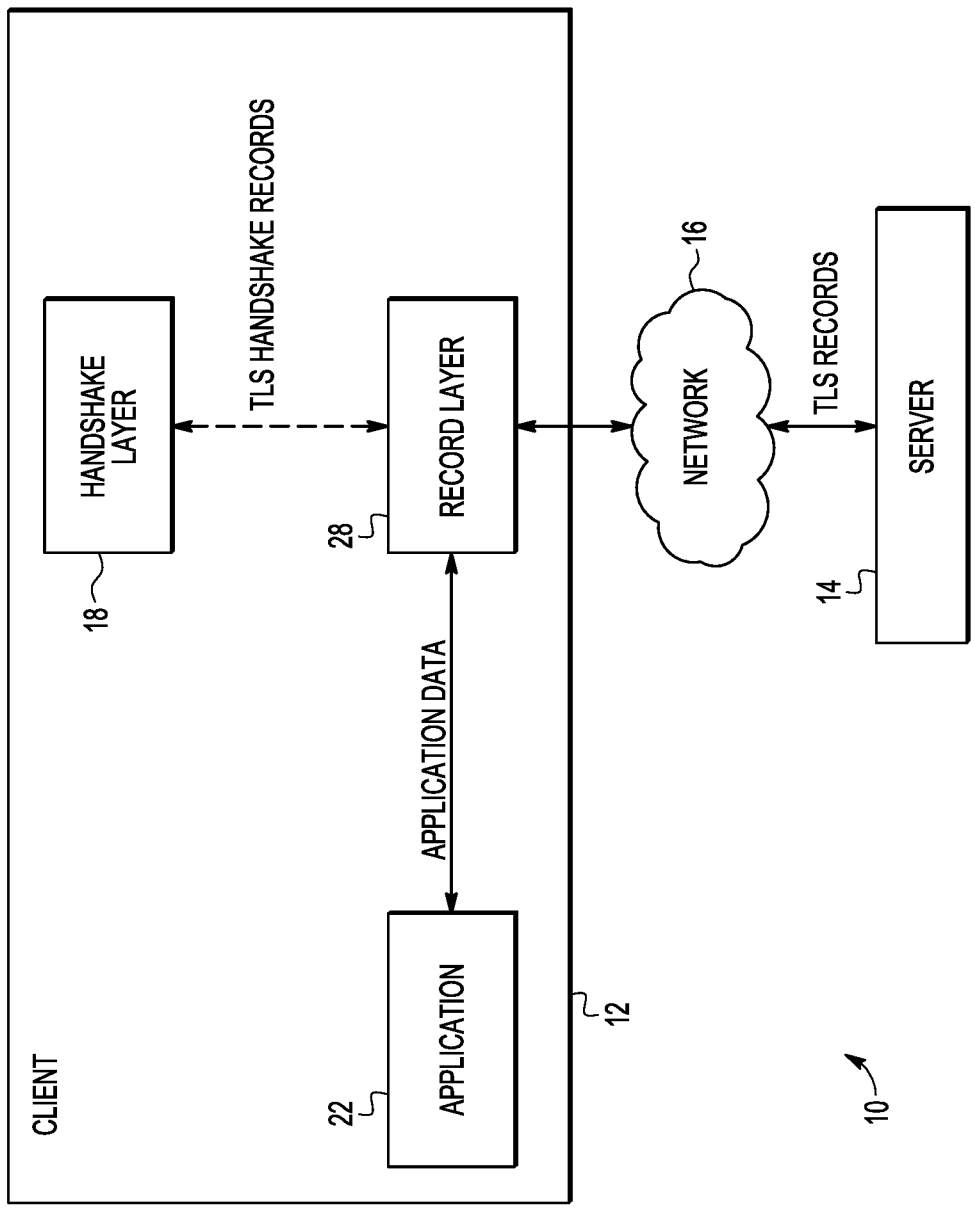
FIG. 1 illustrates a communications system in accordance with an embodiment.

Generally, there is provided, a method for establishing a secure communication session in a communication system that separates and decouples a handshake layer functional block from a record layer functional block. To ensure proper synchronization of the handshake layer with the record layer, one or more internal control messages are used for communication between these blocks. In one embodiment, an internal message may be provided to the record layer by the handshake layer to authorize the record layer to process application data before the handshake phase of the session is complete to avoid wait states in the processing.

Separating the functional blocks from each other increases security by limiting the impact of exploitable vulnerabilities to the layer where that vulnerability is found. On operating systems separating user mode from kernel mode implementing the record layer in kernel space strengthens the isolation of vulnerabilities and at the same time provides increased performance by reducing the amount of context switches and data copies between these contexts while keeping the complex and potentially error-prone handshake out of the kernel. The method also improves the security, flexibility, and performance of systems and eliminates wait states in record layer processing. In addition, in networks with resource constrained end nodes (e.g. Internet of Things networks), it is beneficial to delegate the handshake from the constrained end nodes to a less constrained system (e.g. a gateway) and only keep the smaller and simpler record layer implementation on the constrained end nodes.

The method is suitable for different communications protocols over reliable as well as unreliable transport protocols and allows the record layer to be as simple as possible. This has the additional benefit of making it easily verifiable and suitable for kernel implementation as well as allowing tight integration with connectivity stacks and specialized hardware.

In accordance with an embodiment, there is provided, a method for establishing a secure communication session in a communications system, the method including: providing a handshake layer functional block in a first communication peer; providing a data communication layer functional block separate from the handshake layer functional block in the first communication peer, wherein functionality of the data communication layer functional block is not duplicated in the handshake layer functional block; detecting that the data communication layer functional block is unable to process a received encrypted message; transmitting, by the data communication layer functional block, a configuration request message to inform the handshake layer functional block that the data communication layer functional block is not able to continue without further configuration processing; transmitting, by the handshake layer functional block to the data communication layer functional block, a next message request message to continue processing; transmitting, by the data communication layer functional block to the handshake layer functional block, a finished message to indicate a handshake phase of the protocol session is complete; transmitting, by the handshake layer functional block, a set channel state message to enable the data communication layer functional block to process application data; and transmitting application data from the data communication layer functional block of the first communication peer to a second communication peer. The first communication peer may be characterized as being a transport layer security (TLS) client and the second communication peer may be characterized as being a TLS server. Handshake messages between the handshake layer functional block and the second communication peer may be provided through the data communication layer functional block. Handshake messages between the handshake layer functional block and the second communication peer may not be routed through the data communication layer functional block. Handshake messages may be encrypted. The method may further include transmitting, by the handshake layer functional block, in response to the configuration request message, a next message request to enable the data communication layer functional block to process application data after the handshake phase is complete. The handshake layer functional block may be implemented in a trusted execution environment of the communication system. The method may further include: providing a connection between the handshake layer functional block and a content delivery network (CDN); and providing handshake layer functions for the CDN by the handshake layer functional block.

In another embodiment, there is provided, a method for establishing a secure communication session in a communications system, the method including: providing a handshake layer functional block in a first communication peer; providing a record layer functional block separate from the handshake layer functional block in the first communication peer, wherein functionality of the record layer functional block is not duplicated in the handshake layer functional block; detecting that the record layer functional block is unable to process a received encrypted message; transmitting, by the record layer functional block, a configuration request message to inform the handshake layer functional block that the record layer functional block is not able to continue without further configuration processing; transmitting, by the handshake layer functional block to the record layer functional block, a next message request message to continue processing; transmitting, by the record layer functional block to the handshake layer functional block, a finished message to indicate a handshake phase of the protocol session is complete; transmitting, by the handshake layer functional block, a set channel state message to enable the record layer functional block to process application data; and transmitting application data from the record layer functional block of the first communication peer to a second communication peer. The first communication peer may be characterized as being a transport layer security (TLS) client and the second communication peer may be characterized as being a TLS server. Handshake messages between the handshake layer functional block and the second communication peer may be provided through the record layer functional block. Handshake messages between the handshake layer functional block and the second communication peer may not be routed through the record layer functional block. Handshake messages may be encrypted. The method may further include: providing a connection between the handshake layer functional block and a content delivery network (CDN); and providing handshake layer functions for the CDN by the handshake layer functional block.

In yet another embodiment, there is provided, a method for establishing a secure communication session in a communications system, the method including: providing a handshake layer functional block in a transport layer security (TLS) server; providing a record layer functional block separate from the handshake layer functional block in the TLS server, wherein functionality of the record layer functional block is not duplicated in the handshake layer functional block; detecting that the record layer functional block is unable to process a received encrypted message; transmitting, by the record layer functional block, a configuration request message to inform the handshake layer functional block that that the record layer functional block is not able to continue without further configuration processing; transmitting, by the handshake layer functional block to the record layer functional block, a next message request message to continue processing; transmitting, by the record layer functional block to the handshake layer functional block, a finished message to indicate a handshake phase of the protocol session is complete; transmitting, by the handshake layer functional block, a set channel state message to enable the record layer functional block to process application data; and transmitting application data from the record layer functional block of the TLS server to a TLS client. Handshake messages between the handshake layer functional block and the TLS client may be provided through the record layer functional block. Handshake messages between the handshake layer functional block and the TLS client may not be routed through the record layer functional block. Handshake messages may be encrypted. The handshake layer functional block may be implemented in a trusted execution environment of the communication system. The method may further include: providing a connection between the handshake layer functional block and a content delivery network (CDN); and providing handshake layer functions for the CDN by the handshake layer functional block.

FIG. 1 illustrates communications system 10 in accordance with an embodiment. Communications system 10 includes a client 12 and a server 14. Client 12 and server 14 communicate with each other via a network 16. In one embodiment, communications system 10 is compatible with a TLS protocol. Example protocols are TLS version 1.2 as provided in IETF standard publications RFC5246 and DTLS version 1.2 as provided in RFC6347. In another embodiment, communications system 10 may be compatible with one or more different protocols. Network 16 may include one or several different communication network types, such as the internet or a private network. Client 12 includes handshake layer functional block 18 separate from record layer functional block 20. Client 12 also includes one or more applications such as application 22. Server 14 may be configured similar to, or the same as, client 12. Note that the roles of client 12 and server 14 may be reversed, that is, client 12 may use a decoupled implementation of the handshake layer and the record layer, or server 14 may use the decoupled implementation. In one embodiment, handshake layer functional block 18 is implemented in a secure element for providing secure storage for long term cryptographic keys.

A communication session is established for communication of application data by handshake layer 18. All types of TLS records labeled "TLS RECORDS" are communicated between server 14 and client 12. The TLS RECORDS may be either TLS HANDSHAKE RECORDS or TLS APPLICATION DATA RECORDS. During establishment of the communication session, the TLS HANDSHAKE RECORDS are communicated between handshake layer 18 and record layer 20. The two separate functional layers do not have to be co-located and running on the same device. After the handshake is complete, unencrypted application data labeled "APPLICATION DATA" will be received from application 22, packed into TLS application data records, encrypted by record layer 20, and sent to server 14. The application data may be communicated in plain text or encrypted, depending on the embodiment.

In accordance with an embodiment, the handshake and data communication functionalities of a network security protocol are split between handshake functional block 18 and record layer functional block 20 during all phases of the protocol and without any overlap or duplication of functionality. Handshake layer functional block 18 is responsible for session establishment (consisting of protocol negotiation, key agreement and authentication of the communication end points), while the record layer functional block is responsible for protecting confidentiality and integrity of exchanged application data. In other protocols, the record layer functional block may be referred to with a different label. In the herein described embodiments, "record layer" is used in a general sense to refer to any data communication functional block that is responsible for processing and transmitting application data. Because both blocks operate together to establish a communication session, both blocks need to be synchronized at certain points during the execution of the handshake phase of the TLS protocol. In one embodiment, communication and synchronization of the two functional blocks is achieved by extending the network security protocol by adding internal control messages that are only used for communication between these blocks. Using internal control messages allows the described approach to be used over any interface between the two functional blocks. Also, the internal control messages can be multiplexed with the TLS protocol standard control messages so that an existing interface between the two functional blocks can be used.

Figure 2:
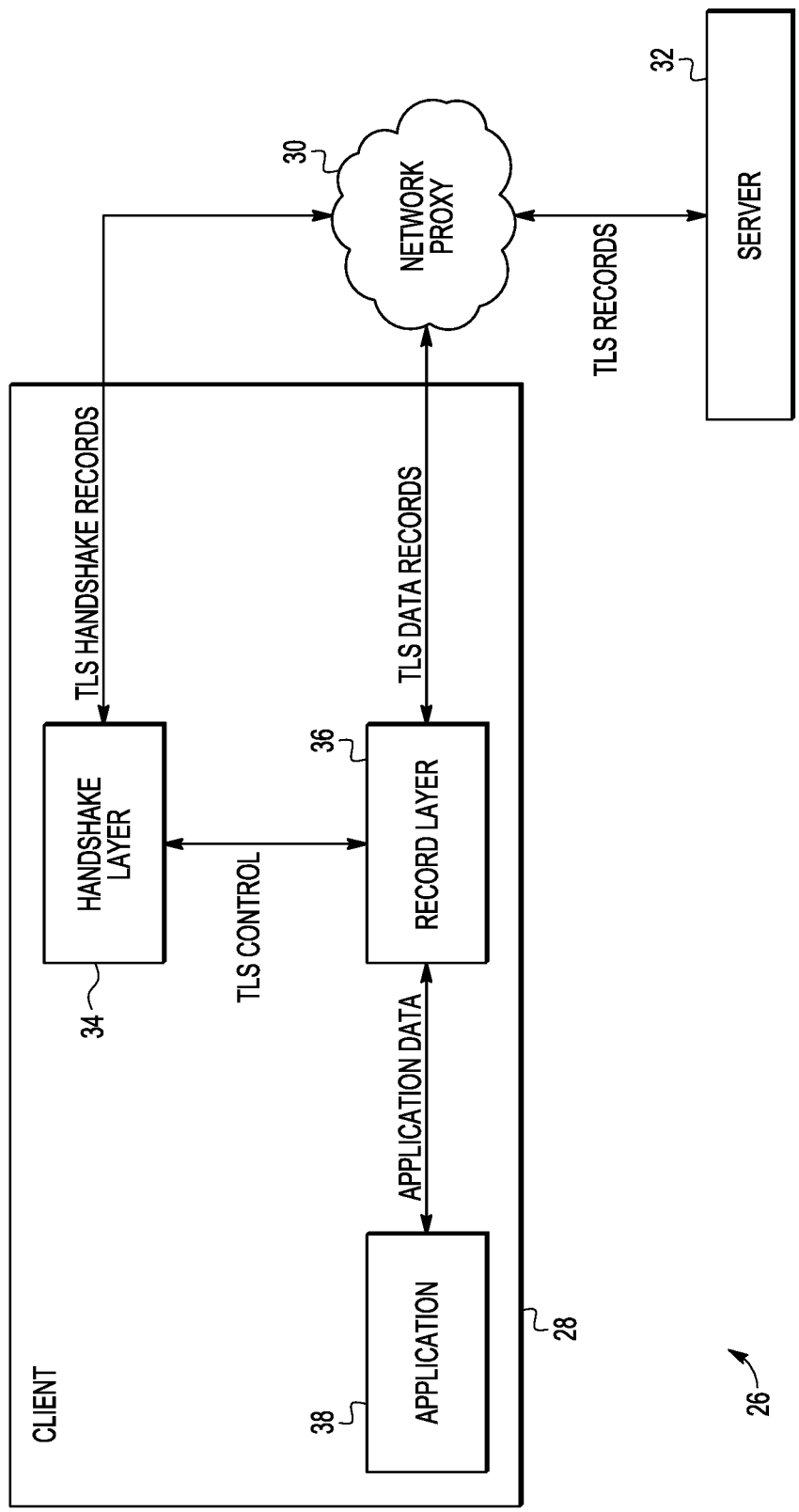
FIG. 2 illustrates a communications system in accordance with another embodiment.

FIG. 2 illustrates communications system 26 in accordance with another embodiment. Communications system 26 includes client 28 and server 32. Client 28 and server 32 communicate with each other via a network proxy 30. Network proxy 30 may include one or several communication network types, such as the internet or a private network. Client 28 includes handshake layer functional block 34, record layer functional block 36, and application 38. Server 32 may be configured similarly to, or the same as, client 28.

Communications system 26 differs from communications system 10 in that handshake layer 34 and record layer 36 are both connected directly to network proxy 30. A communication session is established for communication of application data by handshake layer 18. All types of TLS records TLS RECORDS, such as TLS HANDSHAKE RECORDS OR TLS APPLICATION DATA RECORDS, are communicated between server 32 and client 28 via network 30. During establishment of the communication session, TLS handshake records labeled "TLS HANDSHAKE RECORDS" are communicated between handshake layer 34 and record layer 36. After the communication session is established, application data labeled "APPLICATION DATA" may be communicated between record layer 20 and application 38. After the handshake is complete, application data will be received from application 22, packed into TLS application data records, and encrypted by the record layer and sent to server 14. Control messages labeled "TLS CONTROL" are passed between handshake layer 34 and record layer 36.

The embodiment of FIG. 2 may be useful, for example, in the case where a content delivery network (CDN) server is connected to client 28 or server 32 via network proxy 30. Handshake layer 34 can take care of, and will have full control over, all aspects related to the communication set-up for a CDN server (not shown) such as server and/or client authentication, communication parameter exchange and selection, session key establishment and session key renewal, while the record layer takes care of the actual data exchange, including data encryption and message authentication. If there is more than one CDN server, handshake layer 34 may be shared among the CDN servers. For communication establishment for a CDN server, handshake layer 34 functions as a handshake server and contains the private key for the public key certificate that will be visible to end-user devices. All CDN servers allocated to handshake layer functional block 34 receive a public key certificate for authentication to handshake layer 34. A CDN server can set up a secure and authenticated communication link with handshake layer 34 using, for example, TLS or VPN (virtual private network). TLS will provide the communication link for the communication with the user device. Whenever a user device connects to the system, it will try to set up a TLS connection with a CDN server. The CDN server will forward the TLS handshake requests to handshake layer 34 over the link. Handshake layer 34 will then authenticate itself to the user device, proving to the user that the user is connecting to the intended service. Also, handshake layer 34 can then perform any necessary checks and configure the communication according to the TLS protocol to generate a session key. At the end of the handshake, handshake layer 34 and the user device will have established a shared session key that is used for data exchange between the user device and the CDN server.

Figure 3:
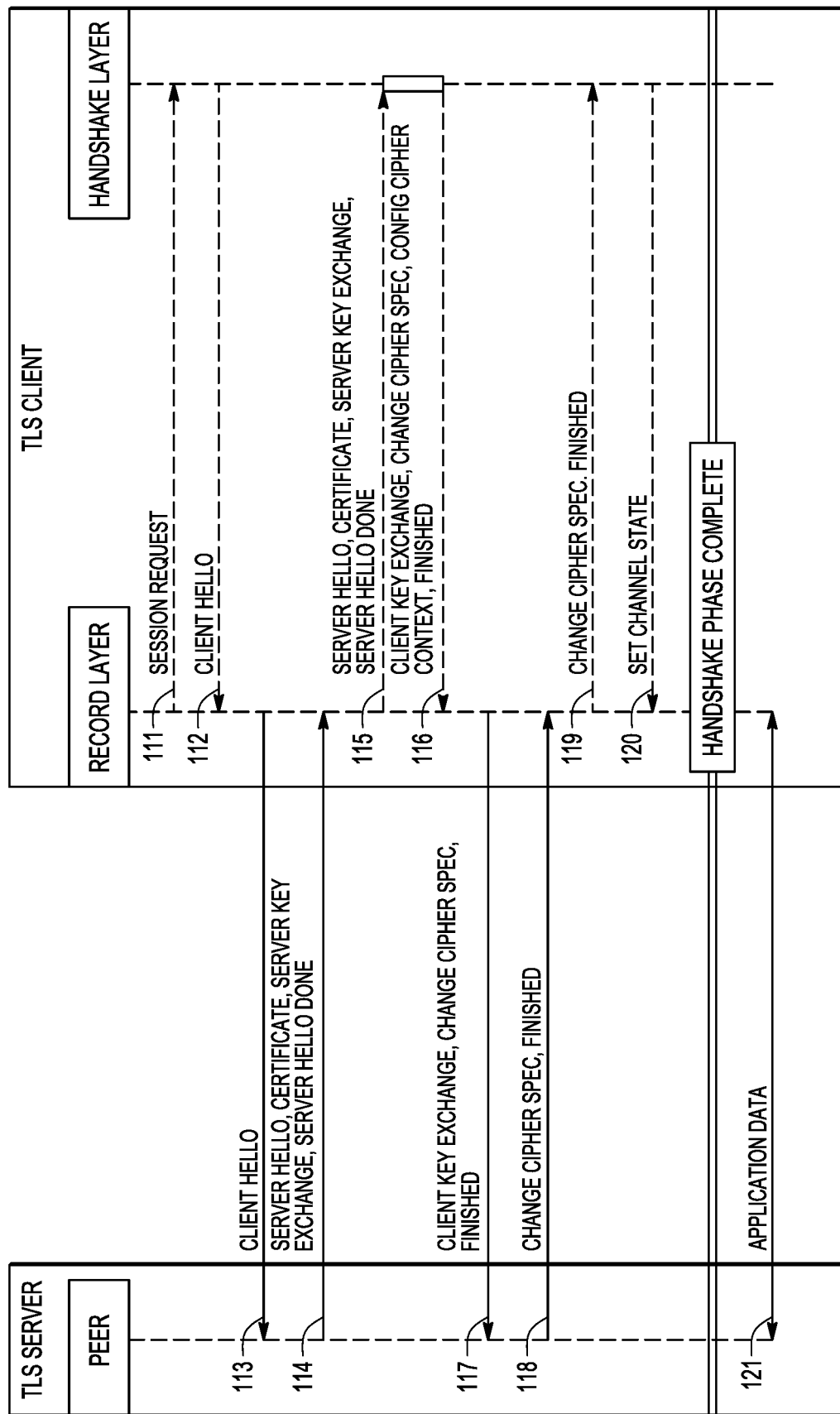
FIG. 3 illustrates a sequence diagram of a method for synchronizing a communication session in accordance with an embodiment.

FIG. 3 illustrates a sequence diagram of a method for establishing and synchronizing a communication session in accordance with an embodiment. The sequence diagram is applicable to the communications systems of both FIG. 1 and FIG. 2. As one example, the embodiment of FIG. 3 will be described in the context of the TLS protocol. Also, in FIG. 3, a session key is generated by the handshake layer functional block and transmitted to the record layer functional block. The handshake layer and the record layer work together during all phases of the TLS protocol. Communication and synchronization between the two functional blocks is achieved using internal control messages in addition to, and similar to, the standard messages used by the TLS protocol. Alternative embodiments may use a control interface based on function calls or proprietary message formats.

Referring to FIG. 3, at sequence step 111, an internal control message called SessionRequest is sent to the handshake layer from the record layer to initiate a session. At sequence step 112, a ClientHello message is returned by the handshake layer to the record layer. Initially, during setup of a TLS communication session the record layer functional block is only able to process unprotected messages. Messages containing application data are not permitted to pass in any direction from the record layer functional block while control messages are simply forwarded to and from the handshake layer functional block. At sequence step 113, the record layer forwards the ClientHello message to the TLS server. The TLS server then transmits, at sequence step 114, messages ServerHello, Certificate, ServerKeyExchange, and ServerHelloDone to the record layer. At sequence step 115, the record layer communicates these messages on to the handshake layer. No further interaction between the functional blocks is required until the handshake layer functional block 18 or 34 has established the session keys and negotiated the cryptographic parameters to be used by record layer functional block 20 or 36 during the communication session. At sequence step 116, the session keys and parameters are transmitted to the record layer by the handshake layer. In addition, an internal control message in accordance with an embodiment, and referred to as "ConfigCipherContext" message, is provided to the record layer.

When the record layer detects that it is not able to process a message yet, it must pause its processing of incoming messages and wait until the handshake layer provides the configuration needed to continue. Because messages could be reordered or even lost (in case of unreliable transfer) or a malicious entity could have tampered with the messages, simply pausing processing of incoming messages could cause long delays while waiting for a timeout or may even cause deadlocks. This could potentially be misused for denial-of-service (DoS) attacks. To avoid this situation, as illustrated herein, the record layer can simply send another new internal command message referred to as "ConfigRequest" message (FIG. 4) informing the handshake layer that it is not able to continue without further configuration. Depending on its internal state the handshake layer can either reply with another new internal command message referred to as "NextMessageRequest" message (FIG. 4) telling the record layer to continue processing (potentially discarding the message it is unable to process), or by sending the required configuration using a ConfigCipherContext message after it is done with its internal processing.

There is an inherent race condition between the handshake layer and record layer. The handshake layer is attempting to finish processing of the handshake messages and transmit the parameters to the record layer. The record layer is attempting to process the first encrypted message, but is not able to process the first encrypted message because the record layer must wait for the handshake layer. Note that the method used by the record layer to detect that it is not prepared to process an incoming message is protocol dependent. In TLS version 1.2 a special message "ChangeCipherSpec" is used to signal the arrival of the first encrypted message, while in DTLS the message header contains a field called epoch that is incremented whenever the message is encrypted using a new cipher context (i.e. in case of the first encrypted message this epoch is 1 instead of 0). Some protocols don't provide any indication which cipher context is required to process a message. For example, TLS version 1.3, the next version of TLS, will not provide any indication that is accessible to the record layer, the cipher context can only be inferred from the handshake state. These protocols can be handled by either assuming a new cipher context is needed for each incoming handshake record or by inspecting the handshake messages to derive that information inside the record layer. At sequence step 117, the record layer forwards the ClientKeyExchange, ChangeCipherSpec, and Finished messages to the server. At sequence step 118, the server replies with the ChangeCipherSpec and Finished messages, which the record layer forwards on to the handshake layer at sequence step 119.

In all versions of TLS/DTLS the first encrypted message is still a handshake message and the handshake phase is not complete, so for security reasons even after the record layer is able to process encrypted messages it is still not allowed to process and forward application data until the handshake phase is complete and the communication peer (TLS server) is authenticated. In accordance with the described embodiment, another internal command message referred to as "SetChannelState" message is used to allow the handshake layer to switch the state of the record layer to allow processing of application data. This message can be split into two parts to allow processing of application data independently for both reception and transmission of data. A similar race condition as before exists between the handshake layer and the record layer. When the record layer detects that it is not allowed to process an incoming application data message yet, it has to pause processing of incoming messages and wait until the handshake layer provides the SetChannelState message changing the internal state to allow incoming data messages to be processed. As previously discussed, to avoid long delays or even deadlocks, the record layer can send another ConfigRequest message informing the handshake layer that it is not able to continue without further configuration processing. Again, depending on its internal state the handshake layer can either reply with a NextMessageRequest message telling the record layer to continue processing or by sending the required SetChannelState message changing the internal state to allow processing of application data after it is done with its internal processing. Therefore, at sequence step 120, the SetChangeState message is provided to the record layer by the handshake layer to indicate that the handshake phase is complete. Application data can then be processed and exchanged between the TLS Client and the TLS server.

Both TLS and DTLS support features that require handshake messages to be processed after the handshake phase is completed or even restart a new handshake phase (e.g. session renegotiation, key update, delayed client authentication). These messages all can be handled in the same way as during the initial handshake phase. If a new cipher context is established (i.e. new session keys and/or crypto parameters), the new cipher context will be detected by the record layer using the same mechanism as during the initial handshake based on the incremented epoch in DTLS and based on the received ChangeCipherSpec message in TLS. The same mechanisms for synchronization based on internal control messages are used as described above. Initially, as during the first handshake, the processing of application data messages will not be allowed for the newly established cipher context until the handshake layer sends a SetChannelState message to allow application data. Generally, the old cipher context needs only to be kept until the new context is configured, but especially for unreliable transport (DTLS) both contexts can be used in parallel for a time period to be able to process delayed application data still using the old context.

Further internal control messages are used for error handling. The record layer informs the handshake layer whenever it encounters a critical failure (e.g. failed decryption or integrity check) so that the handshake layer can react as required by the protocol (e.g. send a TLS alert message to the peer and terminate the connection). The handshake layer can send alert messages itself but needs to inform the record layer if it determines the connection has to be terminated.

Using internal control messages as described above allows the herein described approach to be used over any interface between the handshake and record layer functional blocks, even over a network in the case where the two functional blocks are separated. The approach provides the ability to multiplex the internal control messages with the standard control messages of the protocol, and generally simplifies processing and synchronization of these internal control messages.

Furthermore, splitting the functionalities of the handshake and record layers improves the security, flexibility and performance of systems using the network protocol. The record layer may benefit from tighter integration with network and connectivity stacks as well as specialized hardware for offloading and accelerating symmetric cryptography operations to increase performance and security. On operating systems separating user mode from kernel mode, implementing the record layer in kernel space allows for increased performance by reducing mode switches and data copies between these contexts while keeping the complex and potentially error-prone handshake out of the kernel. Separating the functional blocks from each other generally improves security by limiting the impact of exploitable vulnerabilities to the block where that vulnerability is found. In networks with resource constrained end nodes, e.g., Internet of Things (IoT) networks, it can be beneficial to delegate the handshake from constrained end nodes to a less constrained system (e.g. a gateway) and only keep the relatively compact record layer implementation on the constrained end nodes.

Long-term cryptographic keys may be protected by implementing the handshake layer on a tamper-proof hardware block (e.g. a secure element) or inside a protected execution environment (e.g. ARM TrustZone), while preserving the performance advantages needed for transmitting higher bandwidth application data by implementing the record layer outside of the protected environment. Using a tamper-proof hardware block provides more control over the usage of the keys. Also, the record layer functionality may be completely offloaded to another processing unit such as a network interface card.

Because the record layer can immediately start processing application data messages after the handshake is complete, the described embodiment reduces the setup time and delay before application data is processed. In addition, there is no switch required between the two separate functional blocks and there is no need to transfer intermediate cryptographic state information (e.g. nonces or initialization vectors) between them. Also, it is easier to handle protocols over unreliable transport (e.g. DTLS) because it is always clear how and by which of the two layers messages have to be processed, even if messages are reordered or even lost. The described embodiment does not require any modifications to a network security protocol and is compatible with existing implementations of the protocol. All specifics of the handshake layer are completely abstracted away from the record layer implementation to support compact and verifiable implementations. This will also make it easier to keep and reuse the record layer implementation when replacing the handshake layer with new handshake protocols. Additionally, the described mechanism for synchronization does not introduce any additional buffering of messages, which makes it easier to integrate the client or server into diverse systems and makes implementations tightly integrated with hardware, or makes implementations on partially programmable hardware feasible.

Figure 4:
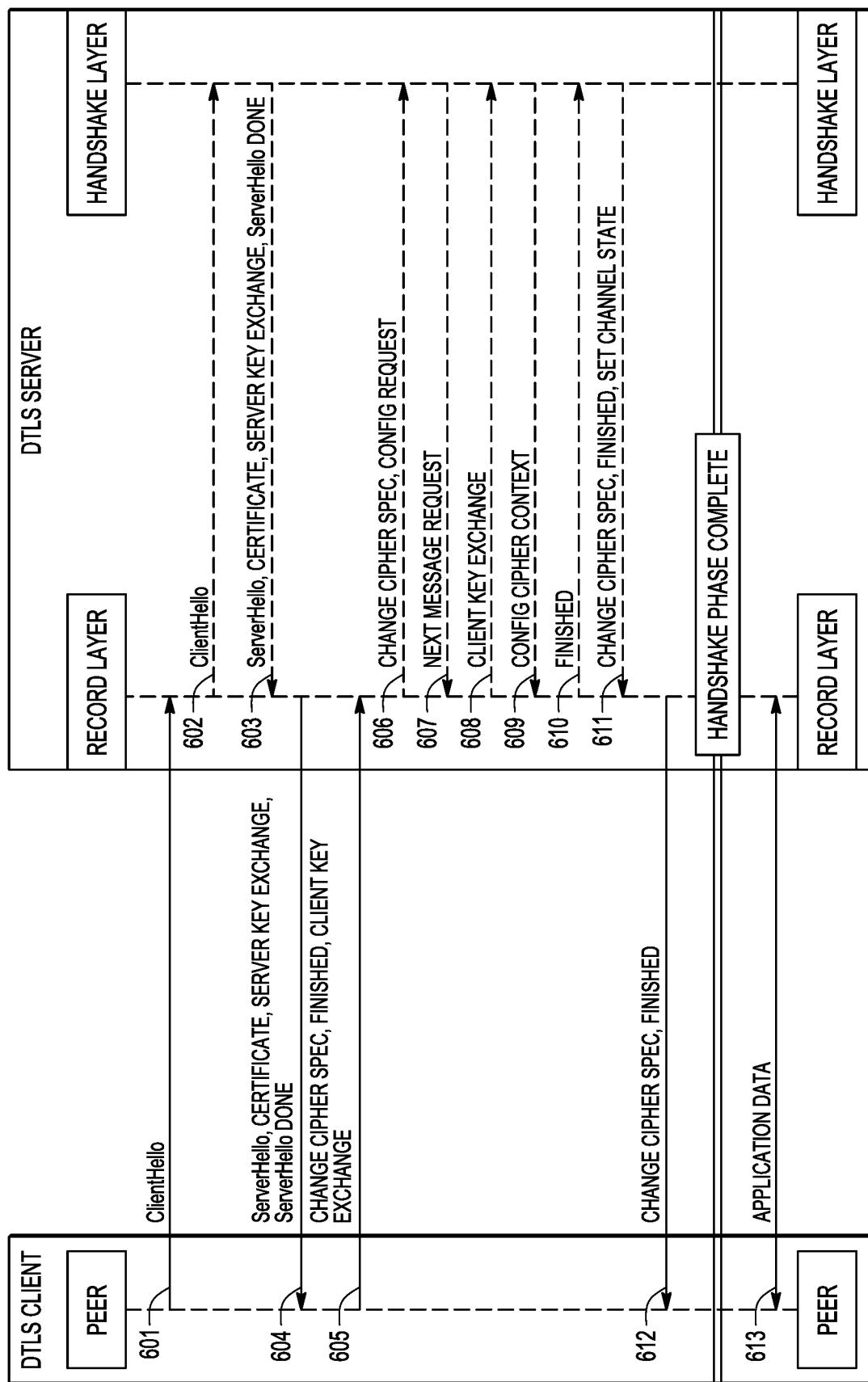
FIG. 4 illustrates a sequence diagram of a method for synchronizing a communication session in accordance with an embodiment.

FIG. 4 illustrates a sequence diagram for a method for completing a handshake for a DTLS client initiated communication session with a decoupled DTLS server in accordance with an embodiment. As DTLS works over unreliable transport (UDP), it is possible that messages are not received in the correct order because they have been reordered somewhere on the path between both communication end points. In TLS, over TCP, message loss or reordering is only possible when an attacker is manipulating the messages. In the example of FIG. 4, steps 601 through 605 proceed normally. At step 601, a ClientHello message is transmitted from the Client to the record layer of the server. At step 602, the record layer of the server forwards the ClientHello message to the handshake layer. At step 603, the handshake layer returns a ServerHello message to the record layer. Also, the handshake layer provides Certificate, ServerKeyExchange, and ServerHelloDone messages to the record layer. At step 604, the messages from step 603 are forwarded to the Client by the record layer of the decoupled server. However, at step 605, the order of the messages is changed from the normal order. As illustrated at step 605, the ClientKeyExchange message is received after the Finished message instead of before the ChangeCipherSpec. After step 605, the messaging will work normally until step 607. At step 606, the ChangeCipherSpec message is provided to the handshake layer along with the internal control ConfigRequest message. The ConfigRequest message informs the handshake layer that the record layer is not able to continue without further configuration. In the case where the messages of step 605 were provided in the correct order, the handshake layer would have received every handshake message it needs, including the ClientKeyExchange. The handshake layer would have been able to answer the ConfigRequest with the ConfigCipherContext message that provides the necessary configuration to be able to process encrypted messages. However, because the ClientKeyExchange has not been received yet in the illustrated example, this is not possible. So instead, the handshake replies at step 607 with the internal control NextMessageRequest message in accordance with an embodiment. The NextMerssageRequest message will notify the record layer that something has gone wrong. In TLS, the above described situation cannot happen unless there was an attack. In the event of an attack in TLS, the session establishment would be aborted immediately. However, in DTLS the record layer can attempt to recover as shown in FIG. 4 by putting aside the Finished message and forwarding the NextMessageRequest message to the handshake layer at step 607. The NextMessageRequest message informs the record layer to continue processing. At step 608, the next message is the previously missing ClientKeyExchange so the handshake layer can finally generate the ConfigCipherContext at step 609, and the rest of the handshake can continue normally. At step 610, a Finished message is provided to the handshake layer. At step 611, messages ChangeCipherSpec, Finished, and SetChannelState are provided to the record layer. As discussed above, the SetChannelState message is used to allow the handshake layer to switch the state of the record layer to allow processing of application data. When the record layer detects that it is not allowed to process an incoming application data message yet, it pauses processing of incoming messages and waits until the handshake layer provides the SetChannelState message to change the internal state to allow incoming data messages to be processed. At step 612, the record layer transmits the ChangeCipherSpec and Finished messages to the DTLS Client. The handshake phase is then complete. Step 613 illustrates the communication of application data between the DTLS Client and DTLS server. Note that FIG. 4 is only one example, similar situations could occur with other messages and at different times during the execution of the protocol.

Figure 5:
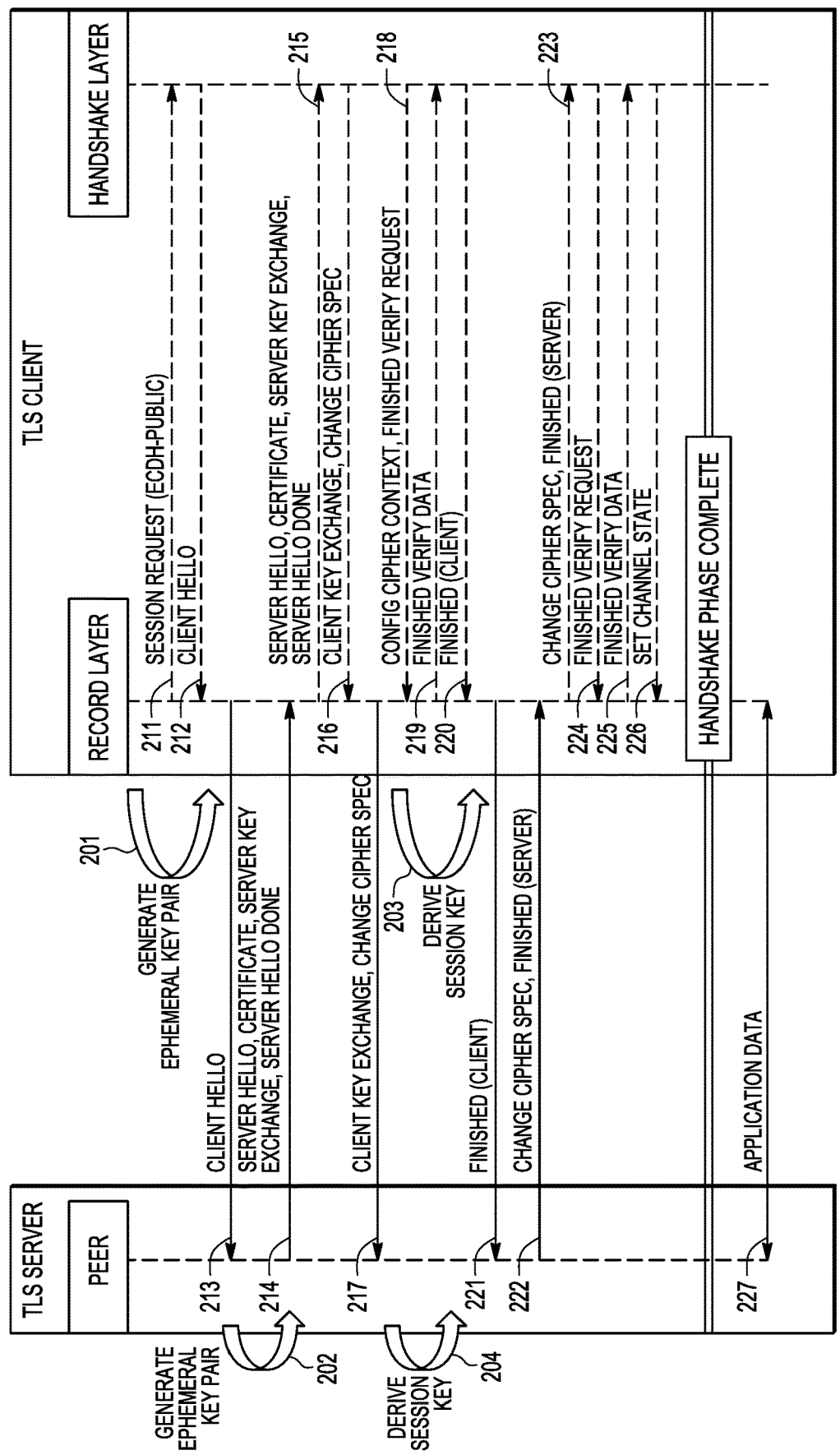
FIG. 5 illustrates a sequence diagram of a method for completing a handshake for a communication session in accordance with another embodiment.

FIG. 5 illustrates a sequence diagram for a method for completing a handshake for a TLS client initiated communication session in accordance with an embodiment. This description focuses on how to apply the sequence illustrated in FIG. 5 to the client side of TLS version 1.2, but the sequence can be applied to any other version of TLS or DTLS and to the server side as well. In FIG. 5, the functionality of the handshake layer and the record layer are separated as described above. The transmission of the session keys from one layer to the other is avoided by allowing the record layer to generate the session keys. In addition, all the other operations that use the session keys are in the record layer as well.

One type of handshake provides a security property called perfect forward secrecy (PFS) by using a Diffie-Hellman key agreement algorithm, e.g., elliptic curve Diffie-Hellman (ECDH) key agreement to securely create a shared secret between both communication peers, or end points. Both end points use ephemeral key pairs newly generated for each handshake. The ephemeral public keys are signed with static private keys to provide authentication. In TLS, the shared secret between the communication peers is used to create a master secret which is used as a secret input for a pseudorandom number function (PRF) that is used to derive multiple individual session keys that are used by the record layer for encryption, decryption, and integrity protection of messages. For this type of handshake, the described embodiment moves the generation of the ephemeral key pair, the execution of the Diffie-Hellman key agreement, and all operations involving the derivation and usage of master and session keys to the record layer, while all other handshake functionality (including client authentication if used) remains part of the handshake layer.

To initiate a session, at sequence step 201, the record layer generates an ephemeral key pair and at step 211 the record layer transmits the public key of the ephemeral key pair to the handshake layer using the internal control message SessionRequest. At sequence step 212, a ClientHello message is returned by the handshake layer to the record layer. The handshake layer extracts the public key from the SessionRequest message, and later, at sequence step 216, transmits it via the record layer to the communication peer using a standard TLS handshake message (ClientKeyExchange) during the handshake procedure with the peer. The TLS server generates an ephemeral key pair 202. Then, the TLS server (communication peer) transmits, at sequence step 214, the messages ServerHello, Certificate, ServerKeyExchange, and ServerHelloDone to the record layer. At sequence step 215, the record layer communicates these messages on to the handshake layer. On reception of the public key of the ephemeral key pair 202 from the communication peer (encoded as ServerKeyExchange message), the handshake layer extracts the public key from the message. At sequence step 216, the ClientKeyExchange and ChangeCipherSpec messages are transmitted to the record layer by the handshake layer, and then to the server at sequence step 217. The TLS server derives the session keys, at step 204, from the public key of ephemeral key pair 201 and the private key from ephemeral key pair 202, in addition to other parameters as specified by the protocol. The new cipher context will be detected by the record layer using the same mechanism as described for the previous embodiments based on the incremented epoch in DTLS and based on the received ChangeCipherSpec message in TLS. In the method of FIG. 3, the ConfigCipherContext message was used to transmit the session keys. In the method of FIG. 5, the ConfigCipherContext message is used to transmit the parameters needed to derive the session keys for the record layer. This includes the public key from ephemeral key pair 202 and the server as well as the client random. The session keys are derived at step 203 from the public key of ephemeral key pair 202 and the private key from ephemeral key pair 201, in addition to other parameters as specified by the protocol. In the method of FIG. 5, at the TLS client, only the record layer has access to the master and session keys. The master and session keys are then used by the record layer to protect further messages sent to the peer, and to decrypt and verify messages received from the peer. Because the handshake layer does not have access to the session keys, the handshake layer is not able to calculate the contents of the messages that provide mutual key confirmation and handshake verification at the end of the TLS handshake. In TLS, these messages are called "Finished" and their payloads (called "Verify_Data") are generated by applying the TLS PRF with the master secret as secret input on a hash of all handshake messages sent and received so far, as illustrated at sequence step 219. To allow the handshake layer to request the calculation of these payloads by the secure channel, an internal control message referred to as "FinishedVerifyRequest" contains the hash of all handshake messages (sequence step 218). A response will be transmitted to the handshake layer in another internal control message referred to as "FinishedVerifyData" (sequence step 219). Alternatively, the record layer could process and generate the TLS Finished messages directly after receiving a hash of all handshake messages from the handshake layer. At sequence steps 220 and 221, the Finished (client) message is forwarded to the server. The server then provides at step 222 the ChangeCipherSpec and Finished(server) to indicate that the handshake phase is complete. At sequence steps 223, 224, 225, and 226, the Finished message is received, verified, and then the handshake phase is completed by the record and handshake layers. At sequence step 227, application data can be processed and transmitted by the record layer. No further interaction between the functional blocks is required until the handshake layer functional block 18 or 34 has established the session keys and negotiated the cryptographic parameters to be used by record layer functional block 20 or 36 during the communication session. The session key is used to protect messages communicated between the TLS server and the TLS client.

The described embodiment can also support session resumption by storing the master secret at the record layer functional block instead of at the handshake layer. The methods are also applicable to TLS handshake types that do not provide forward secrecy. In RSA or pre-shared key (PSK) based handshakes without PFS, the long-term private key or the secret key must be stored at the record layer instead of at the handshake layer. Several additional internal control messages may be added to be able to support these cases as well. For example, additional internal control messages may be needed to allow the handshake layer to request the signing of a TLS CertificateVerify message to support client authentication with a private key at the record layer, and to allow the handshake to request the generation or decryption of an encrypted pre-master secret at the record layer to support RSA-based key exchanges.

Figure 6:
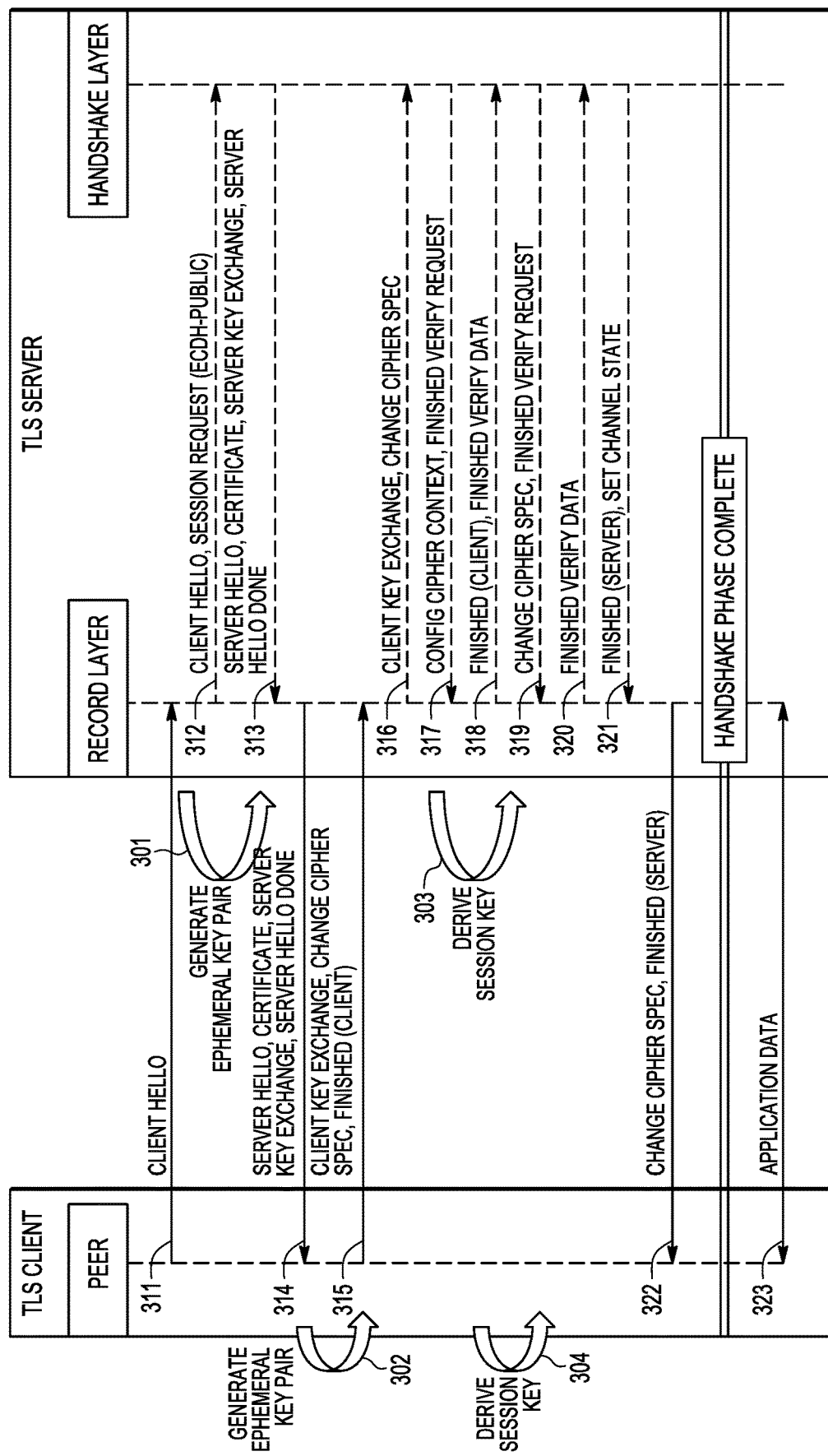
FIG. 6 illustrates a sequence diagram of a method for completing a handshake for a communication session in accordance with another embodiment.

FIG. 6 illustrates a sequence diagram of a method for completing a handshake phase for a peer initiated communication session in accordance with another embodiment. At sequence step 311, the communication peer provides a ClientHello message to the TLS server. The record layer of the TLS server then generates an ephemeral key pair 301. The record layer transmits the public key of the ephemeral key pair 301 to the handshake layer using internal control message SessionRequest at sequence step 312. The ClientHello message from the peer is also provided to the handshake layer. At sequence step 313, the handshake layer communicates the messages ServerHello, Certificate, ServerKeyExchange, and ServerHelloDone to the record layer, which are then forwarded to the peer at sequence step 314. The peer then extracts the ephemeral public key from the ephemeral key pair generated at step 301 from the ServerKeyExchange message. Also, the peer generates another ephemeral key pair at step 302. At sequence step 315, the ClientKeyExchange message containing the public key from ephemeral key pair 302, the ChangeCipherSpec, and the Finished message are transmitted to the record layer of the TLS server, and then to the handshake layer at sequence step 316. A ChangeCipherSpec message indicates the arrival of a first encrypted message. At sequence step 317, the required configuration is sent using a ConfigCipherContext message. The session keys are generated at step 303 by the record layer. Also, the session keys are generated at step 304 by the communication peer (TLS client). Also, at sequence steps 317 and 318, a FinishedVerifyRequest message allows the handshake block to request the calculation of Verify_Data for the Finished message by the record layer. A response will be transmitted to the handshake layer in another internal control message referred to as "FinishedVerifyData" (sequence step 320). At sequence step 321, a Finished(server) message is sent, followed by a SetChannelState to indicate that the handshake phase is complete and the state is being changed. At sequence step 322, the ChangeCipherSpec message is sent to the peer with the Finished(server) message. The handshake phase is complete and at sequence step 323, application data can be processed and transmitted by the record layer.

Because no session keys (or other sensitive data) are transmitted between the blocks, confidentiality protection is not needed for the communication channel between the layers. Depending on the required security level and the protections already in place for the communication channel, integrity protection and authentication might still be needed. Only the handshake layer needs to be provisioned with long-term cryptographic keys and can be used for establishing secure connections for many end nodes. Similarly, the distribution of software and policy updates is also simplified because in most cases only the handshake layer needs to be updated (again protecting many individual end nodes). Only the internal processing of a communication peer is modified. No modifications to the network security protocol that are externally visible are required. Therefore, the disclosed communication system and methods are compatible with existing protocols and implementations of TLS and DTLS and could be applied to future versions of TLS protocols.

Using internal control messages to synchronize the split record layer and handshake layer functionality allows the disclosed methods to be used over any interface between the two layers and even over a network. The internal control messages can be multiplexed with the standard control messages of the TLS protocol.

Figure 7:
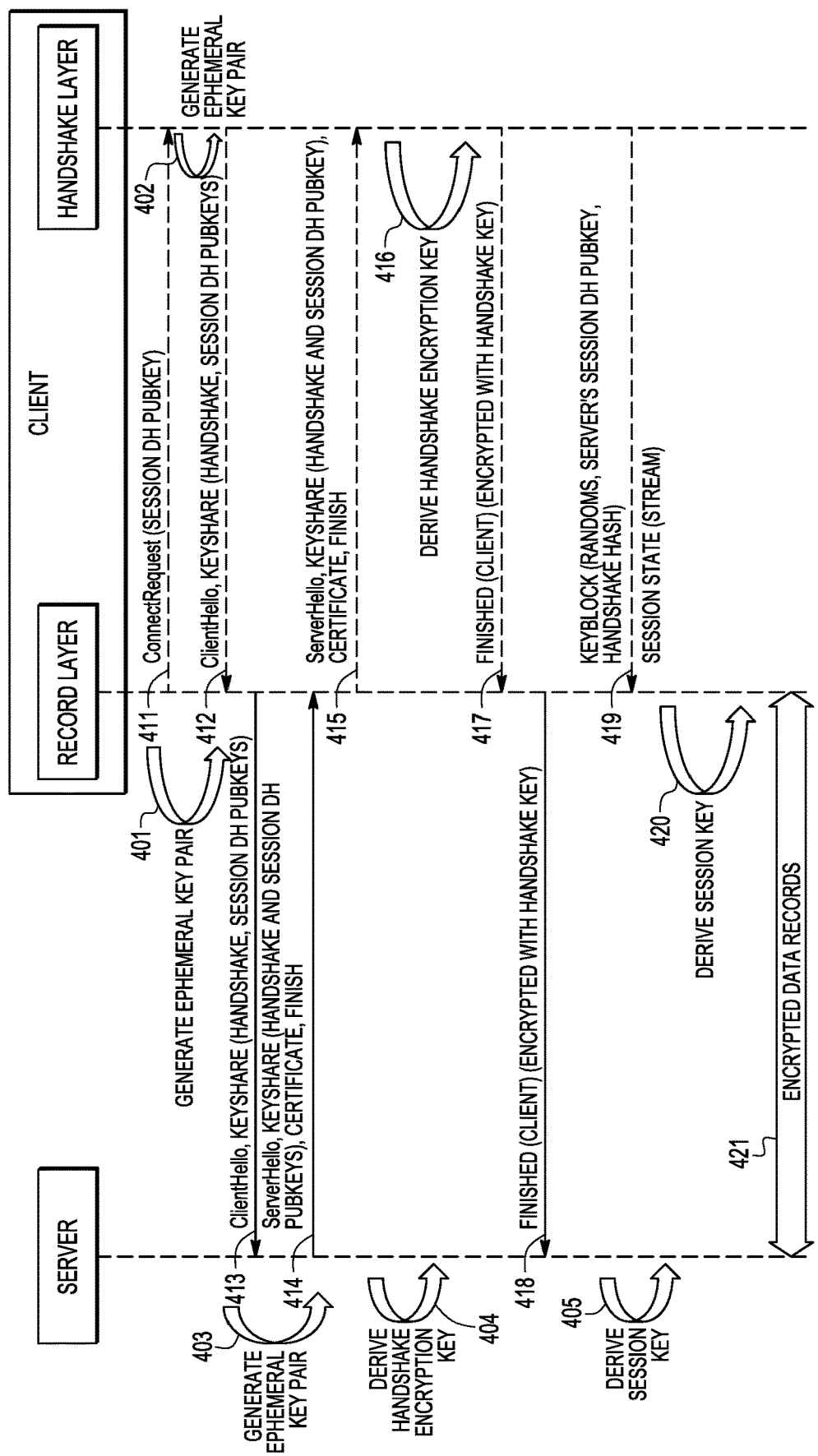
FIG. 7 illustrates a sequence diagram of a method for completing a handshake for a communication session in accordance with another embodiment.

FIG. 7 illustrates a sequence diagram for a method of completing a handshake phase for a communication session in accordance with another embodiment. The method of FIG. 7 is compatible with TLS version 1.3 or DTLS which encrypts handshake messages. The handshake messages are encrypted with handshake encryption keys and data messages are encrypted with session encryption keys. The example of FIG. 7 assumes a decoupled TLS client and a non-decoupled TLS server, where a decoupled TLS client has functionality split and separated into handshake layer functionally separate from record layer functionality. Note that the record layer interfaces with the server in FIG. 7.

Figure 8:
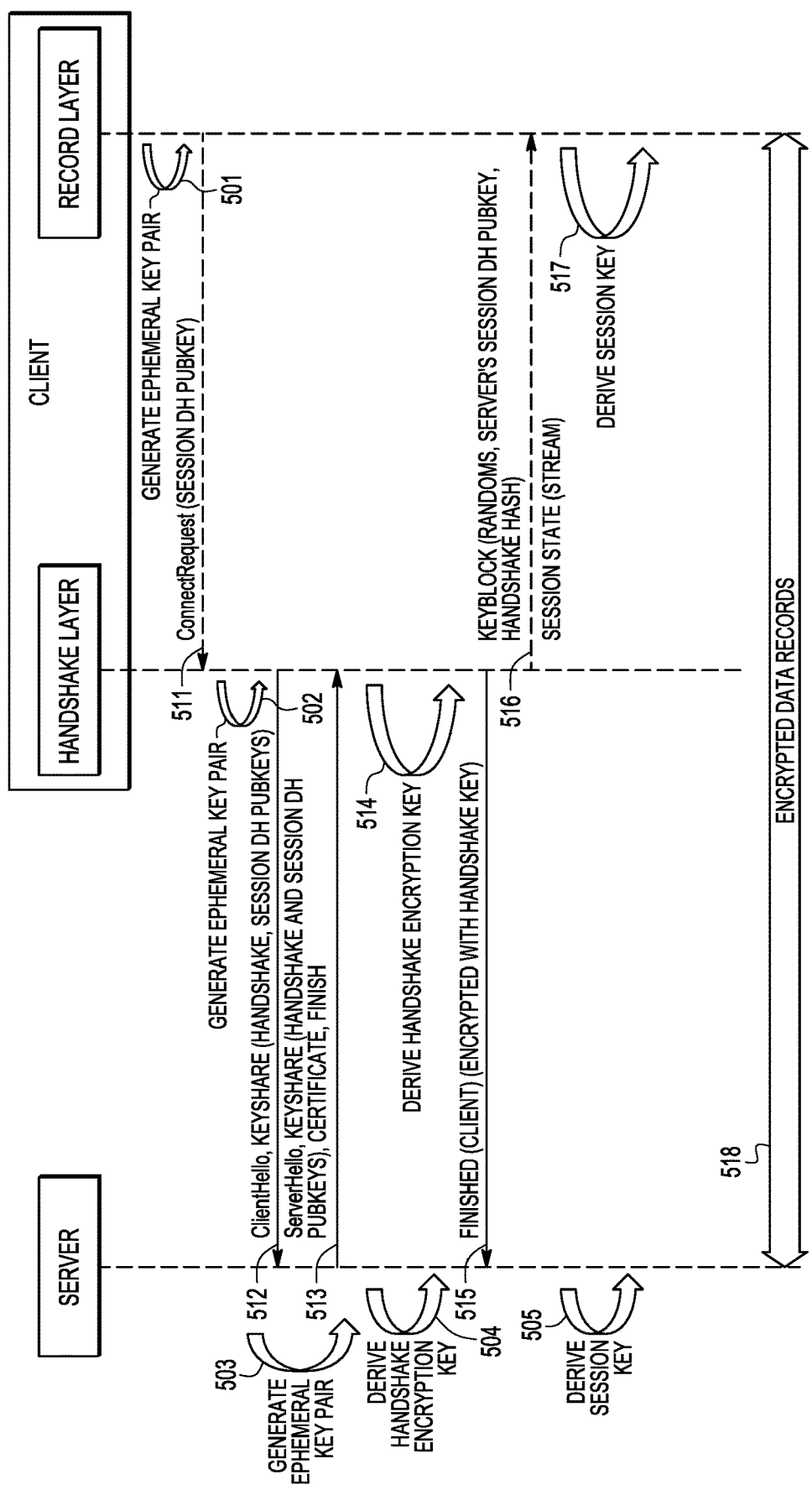
FIG. 8 illustrates a sequence diagram of a method for completing a handshake for a communication session in accordance with another embodiment.

Referring to FIG. 1, FIG. 7, and FIG. 8, both handshake layer 18 and record layer 20 generate an ephemeral Diffie-Hellman (DH) key pair each as illustrated in FIG. 7 at steps 401 and 402. (The method of FIG. 7 is also compatible with FIG. 2.) A key pair generated at handshake layer 18 is called a handshake key share. A key pair of record layer 20 is called a session key share. Note that this is different than the current versions of the TLS protocol with privacy, such as for example, TLS version 1.3, where only one single DH key pair is used for the derivation of both the handshake encryption keys and session keys. The handshake layer derives the handshake encryption keys using the handshake DH keys that were exchanged. The handshake layer forwards the session DH public key of the peer to the record layer. This enables the record layer to derive the session keys. Both the handshake layer and record layer have encryption and decryption capabilities. They use their respective derived keys (i.e. handshake encryption keys at the handshake layer and session keys at the record layer) for outgoing record encryption and incoming record decryption. The handshake layer does protocol encryption on handshake records only. The record layer does protocol encryption on data records only. The symmetric keys are not exchanged between the handshake layer and the record layer.

In FIG. 7, an ephemeral key pair is generated by the record layer at step 401. At sequence step 411, a ConnectRequest message is sent from the record layer to the handshake layer. Record layer 20 sends the DH public key of session key-share to handshake layer 18. Also, another ephemeral key pair is generated by the handshake layer at step 402. In protocol messages, e.g. ClientHello or ServerHello in (D)TLS version 1.3, two session endpoints exchange their respective pairs of DH public keys. That is, handshake DH public keys and session DH public keys are exchanged as shown at sequence step 412. At sequence step 413, the ClientHello message and public keys are sent to the server. The server generates an ephemeral key pair at step 403. At sequence step 404, the server on receiving ClientHello derives its own DH handshake and session key shares. At step 414, the server sends the public keys of the key shares to the client using message ServerHello. At sequence step 415, the record layer forwards the ServerHello and server DH handshake and session key shares to the handshake layer. At sequence step 416, the handshake layer derives the handshake encryption key that the handshake layer will use for handshake records. At sequence step 417, a Finished (Client) message that is encrypted with the handshake key is communicated to the record layer. At sequence step 418, the Finished (Client) message from the handshake layer is forwarded to the server. The server generates the session keys at step 405. At sequence step 419, parameters needed by the record layer to derive the session keys are provided to the record layer. At sequence step 420, the record layer derives the session keys. At sequence step 421, encrypted data records are processed and transmitted. Thereafter, the handshake records are encrypted and decrypted by the handshake layer while data records are encrypted and decrypted by the record layer.

FIG. 8 illustrates a sequence diagram for a method of completing a handshake phase for a communication session in accordance with another embodiment. The method of FIG. 7 is compatible with the TLS version 1.3 or DTLS protocols which encrypts handshake messages. The TLS version 1.3 DTLS protocols would have to be modified to accommodate two key-shares. Like the method of FIG. 7, the handshake messages are encrypted with handshake encryption keys and data messages are encrypted with session encryption keys. The example of FIG. 8 assumes decoupled TLS client and a non-decoupled TLS server, where a decoupled TLS client has functionality split and separate handshake layer and record layer. The handshake layer interfaces with the server in FIG. 8.

At step 501, the record layer generates an ephemeral key pair. At sequence step 511, a ConnectRequest message is sent from the record layer to the handshake layer. At step 502, the record layer also generates an ephemeral key pair. The record layer sends the DH public key of session key-share to the handshake layer. At sequence step 512, the ClientHello message and public keys are sent to the server. At step 503, the server generates its own ephemeral key pair. At sequence step 504, the server derives the handshake encryption keys. At sequence step 505, the server derives a session key. At sequence step 513, the server on receiving ClientHello sends the public key of the ephemeral key pair generated at step 503 to the client using message Server-Hello. At sequence step 514, the handshake layer derives the handshake encryption keys that the handshake layer will use for handshake records. At sequence step 515, a Finished (Client) message that is encrypted with the handshake keys is communicated to the server. At sequence step 516, parameters needed by the record layer to derive the session keys are provided to the record layer. At sequence step 517, the record layer derives the session keys. Thereafter, the handshake records are encrypted and decrypted by the handshake layer while data records are encrypted and decrypted by the record layer. At sequence step 518, encrypted data records are processed and transmitted.

In the described embodiments, separation of handshake and record layers separate the functionality of the handshake layer and the record layer during all phases of the TLS protocol. By separating the functionality without any duplication, transmission of the complete session data and state including cryptographic session keys between the handshake and record layer is avoided because handshake (control) messages are processed exclusively by the handshake layer while application data messages are exclusively processed by the record layer. Also, switching of functionality during data transmission phase TLS is avoided.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. For example, the herein described embodiments may be applied to cases where an IC has several levels of cache memory, and each level may have a speculative cache. Also, any of the existing cache eviction algorithms may be used with both a speculative and a normal cache. In addition, any existing mechanism for cache management may be used with both the speculative and normal cache. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for establishing a secure communication session in a communications system, the method comprising:
   providing a handshake layer functional block in a first communication peer;
   providing a data communication layer functional block separate from the handshake layer functional block in the first communication peer, wherein functionality of the data communication layer functional block is not duplicated in the handshake layer functional block;
   detecting that the data communication layer functional block is unable to process a received encrypted message;
   transmitting, by the data communication layer functional block, a configuration request message to inform the handshake layer functional block that the data communication layer functional block is not able to continue without further configuration processing;
   transmitting, by the handshake layer functional block to the data communication layer functional block, a next message request message to continue processing;
   transmitting, by the data communication layer functional block to the handshake layer functional block, a finished message to indicate a handshake phase of the protocol session is complete;
   transmitting, by the handshake layer functional block, a set channel state message to enable the data communication layer functional block to process application data; and
   transmitting application data from the data communication layer functional block of the first communication peer to a second communication peer.

2. The method of claim 1, wherein the first communication peer is characterized as being a transport layer security (TLS) client and the second communication peer is characterized as being a TLS server.

3. The method of claim 1, wherein handshake messages between the handshake layer functional block and the second communication peer are provided through the data communication layer functional block.

4. The method of claim 1, wherein handshake messages between the handshake layer functional block and the second communication peer are not routed through the data communication layer functional block.

5. The method of claim 1, wherein handshake messages are encrypted.

6. The method of claim 1, further comprising transmitting, by the handshake layer functional block, in response to the configuration request message, a next message request to enable the data communication layer functional block to process application data after the handshake phase is complete.

7. The method of claim 1, wherein the handshake layer functional block is implemented in a trusted execution environment of the communication system.

8. The method of claim 1, further comprising:
providing a connection between the handshake layer functional block and a content delivery network (CDN); and
providing handshake layer functions for the CDN by the handshake layer functional block.

9. A method for establishing a secure communication session in a communications system, the method comprising:
providing a handshake layer functional block in a first communication peer;
providing a record layer functional block separate from the handshake layer functional block in the first communication peer, wherein functionality of the record layer functional block is not duplicated in the handshake layer functional block;
detecting that the record layer functional block is unable to process a received encrypted message;
transmitting, by the record layer functional block, a configuration request message to inform the handshake layer functional block that the record layer functional block is not able to continue without further configuration processing;
transmitting, by the handshake layer functional block to the record layer functional block, a next message request message to continue processing;
transmitting, by the record layer functional block to the handshake layer functional block, a finished message to indicate a handshake phase of the protocol session is complete;
transmitting, by the handshake layer functional block, a set channel state message to enable the record layer functional block to process application data; and
transmitting application data from the record layer functional block of the first communication peer to a second communication peer.

10. The method of claim 9, wherein the first communication peer is characterized as being a transport layer security (TLS) client and the second communication peer is characterized as being a TLS server.

11. The method of claim 9, wherein handshake messages between the handshake layer functional block and the second communication peer are provided through the record layer functional block.

12. The method of claim 9, wherein handshake messages between the handshake layer functional block and the second communication peer are not routed through the record layer functional block.

13. The method of claim 9, wherein handshake messages are encrypted.

14. The method of claim 9, further comprising:
providing a connection between the handshake layer functional block and a content delivery network (CDN); and
providing handshake layer functions for the CDN by the handshake layer functional block.

15. A method for establishing a secure communication session in a communications system, the method comprising:
providing a handshake layer functional block in a transport layer security (TLS) server;
providing a record layer functional block separate from the handshake layer functional block in the TLS server, wherein functionality of the record layer functional block is not duplicated in the handshake layer functional block;
detecting that the record layer functional block is unable to process a received encrypted message;
transmitting, by the record layer functional block, a configuration request message to inform the handshake layer functional block that that the record layer functional block is not able to continue without further configuration processing;
transmitting, by the handshake layer functional block to the record layer functional block, a next message request message to continue processing;
transmitting, by the record layer functional block to the handshake layer functional block, a finished message to indicate a handshake phase of the protocol session is complete;
transmitting, by the handshake layer functional block, a set channel state message to enable the record layer functional block to process application data; and
transmitting application data from the record layer functional block of the TLS server to a TLS client.

16. The method of claim 15, wherein handshake messages between the handshake layer functional block and the TLS client are provided through the record layer functional block.

17. The method of claim 15, wherein handshake messages between the handshake layer functional block and the TLS client are not routed through the record layer functional block.

18. The method of claim 15, wherein handshake messages are encrypted.

19. The method of claim 15, wherein the handshake layer functional block is implemented in a trusted execution environment of the communication system.

20. The method of claim 15, further comprising:
providing a connection between the handshake layer functional block and a content delivery network (CDN); and
providing handshake layer functions for the CDN by the handshake layer functional block.

* * * * *